July 18, 1972 E. ZYCHAL 3,677,860

METHOD AND APPARATUS FOR TRANSFERRING A MAGNETIC SOUND TRACK TO MOVIE FILM

Filed Feb. 19, 1969 5 Sheets-Sheet 1

INVENTOR
EDWARD ZYCHAL

BY

Seidel, Gonda & Goldhammer

ATTORNEYS.

INVENTOR
EDWARD ZYCHAL
BY
Seidel, Gonda & Goldhammer
ATTORNEYS.

July 18, 1972 E. ZYCHAL 3,677,860

METHOD AND APPARATUS FOR TRANSFERRING A MAGNETIC SOUND TRACK TO MOVIE FILM

Filed Feb. 19, 1969 5 Sheets-Sheet 3

INVENTOR
EDWARD ZYCHAL

BY

Seidel, Gonda & Goldhammer

ATTORNEYS.

INVENTOR
EDWARD ZYCHAL
BY
Seidel, Gonda & Goldhammer
ATTORNEYS.

INVENTOR
EDWARD ZYCHAL
BY
Seidel, Gonda & Goldhammer
ATTORNEYS.

3,677,860

METHOD AND APPARATUS FOR TRANSFERRING A MAGNETIC SOUND TRACK TO MOVIE FILM

Edward Zychal, Cornwell Heights, Pa., assignor to Zyco Manufacturing, Inc., Cornwell Heights, Pa.

Filed Feb. 19, 1969, Ser. No. 800,653
Int. Cl. B32b *31/08, 31/12*
U.S. Cl. 156—299 15 Claims

ABSTRACT OF THE DISCLOSURE

A magnetic sound track is transferred onto movie film by a machine which simultaneously feeds film and magnetic tape to a laminating zone where the film passes over a laminating wheel, an open channel curved capillary tube applies a bonding agent to an elongated area, and the magnetic sound track is laminated to the film. The machine is provided with fail-safe mechanisms to shut down the process in case of a break in the film or tape, or the absence of the bonding agent.

This invention relates to a method and apparatus for applying a magnetic sound track to movie film adjacent one edge thereof.

In one embodiment of the present invention the magnetic tape of prescribed width is laminated base down to the film with a fluid to provide adhesion. In a second embodiment of the present invention the magnetic tape of prescribed width is laminated face down with a fluid of special properties which not only provides adhesion to the film but also permits separation of the tape base leaving the magnetic stripe on the film.

There are presently in existence several known methods for applying magnetic sound tracks to film. These methods generally fall in two categories. The first is the so-called coating method whereby a solution of magnetic particles in a binder is striped onto the film. The second method involves the laminating of a strip of plastic material previously coated with magnetic particles onto the movie film.

The so-called coating or striping method has several difficulties which make it undesirable. The primary difficulty is in controlling the width and thickness of the stripe of magnetic material which are quite small. The stripe is normally applied adjacent one edge of the film which presents no problem of its self except that there is a problem of uniformity of coating and particle distribution. This may result in high flutter and relatively high surface noise when in use. When the stripe is applied adjacent to sprocket holes under high humidity conditions a sprocket pattern may be detectable in the recorded sound.

Methods and apparatus for laminating magnetic tape on film have heretofore been proposed. See for example U.S. Pats. Nos. 2,541,136, 2,628,929 and 2,869,878. Despite the teachings of these inventions, it has generally not been possible to obtain a high quality sound track commensurate with the state of the art of magnetic recording. This is particularly true for 8 mm., super 8 and 16 mm. film which require a magnetic stripe of a width in the range of 30–100 mils. Thus, it is an object of the present invention to provide a method and apparatus for laminating a magnetic stripe onto film in such a way that it will permanently adhere to the film and yield high quality sound comparable to good magnetic tape recording standards.

Another object of the present invention is to provide a method and apparatus for accurately positioning the magnetic stripe on the film during the laminating process. A strip of tape having a width of 30–100 mils is difficult to accurately position while laminating it at high speeds to film. The accuracy of such positioning must necessarily be within a small range of tolerances when working with 8 mm. and super 8 film which leaves very little room for error. The apparatus of the present invention is designed to maintain both the film and tape at a constant tension and accurately position the tape with respect to the film without any loss in the speed of the laminating process.

The lamination of magnetic tape to film necessarily must include some type of bonding agent. Since in many instances both the magnetic tape and the film have a similar substrate, namely acetate plastic, the use of methyl ethyl ketone (MEK) or other acetate solvents immediately suggests itself. Indeed, MEK plus a binder or MEK alone has been used for laminating magnetic tape onto movie film. See U.S. Pat No. 2,628,929. However, the use of the correct bonding agent is only part of the problem. It has been determined that the bonding agent must be properly applied to the film and/or magnetic tape in order to secure a good and hence permanent bond which will withstand the rigors of repeated use. The present invention applies the bonding agent to the film itself by using an open channel capillary tube. The advantage of an open channel capillary tube is that the bonding agent is fed to the channel at a continuous rate and applied to the film over an extended area rather than at one particular position.

It has been determined that the application of the bonding agent to an extended area of the film is a distinct advantage. This is primarily because it avoids the flow of the bonding agent over the film and the consequent uncontrollable smearing into unused portions of the film. The direct result is that the proper amount of bonding agent can be applied to the proper place on the film for securing a good bond.

In an alternative embodiment of the present invention, the magnetic tape is laminated face-down to the film. In this embodiment, a polyester base magnetic tape is utilized. The polyester base will not be affected by the fluid utilized to adhere the emulsion to the film.

The film is wetted in the same manner as in the first embodiment of this invention, but the magnetic tape comes into contact with the film face-down. The fluid utilized permeates the oxide coating of the polyester base tape, weakens the bond between the oxide coating and the polyester base, and has sufficient cementing properties to adhere the oxide coating to the film. The fluid utilized tends to gel the oxide coating which facilitates separation of the oxide coating from the polyester base. The fluid utilized may include a plastic in suspension which will be sufficient to gel the oxide coating but will not attack the polyester base.

The stripe adheres to the film within a relatively short period of time on the order of 10 minutes. Thereafter, the polyester base may be peeled away from the film and oxide coating, thus leaving the striped film. The polyester base need not be immediately removed from the film and, in normal operation, the polyester base remains on the film for a minimum of one-half hour.

In both embodiments of this invention there is no need for a balancing stripe on the film. In the alternative embodiment the laminated track is substantially thinner because the base of the magnetic tape is removed.

Other advantages of the present invention will become apparent from the following specification.

For the purpose of illustrating the invention, there is shown in the drawings a form which is presently preferred; it being understood, however, that this invention is not limited to the precise arrangements and instrumentalities shown.

Figure 1:
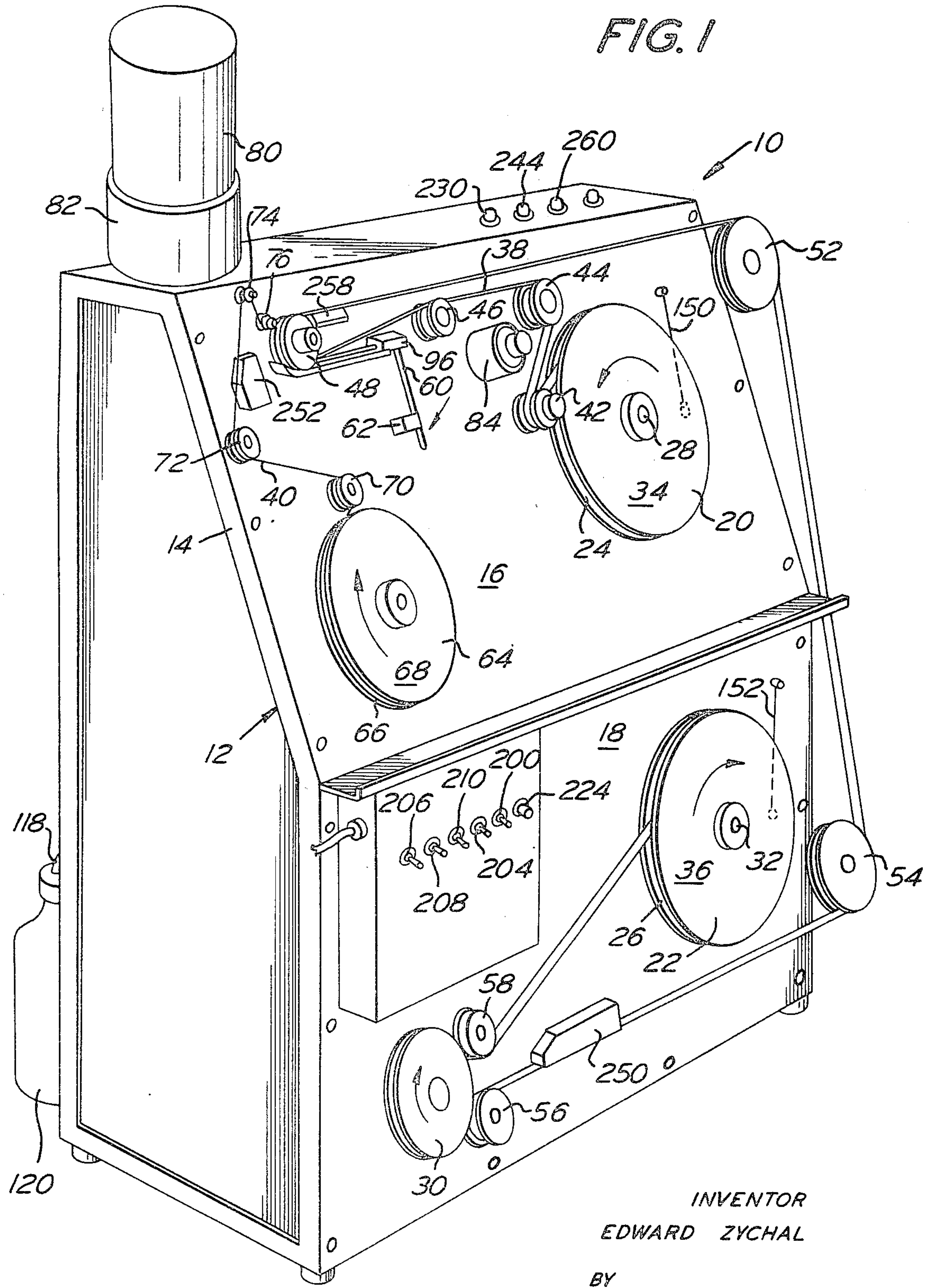
FIG. 1 is a perspective view of the apparatus for performing the method of the present invention showing the cabinet with the film and tape mounted thereon.
Figure 2:
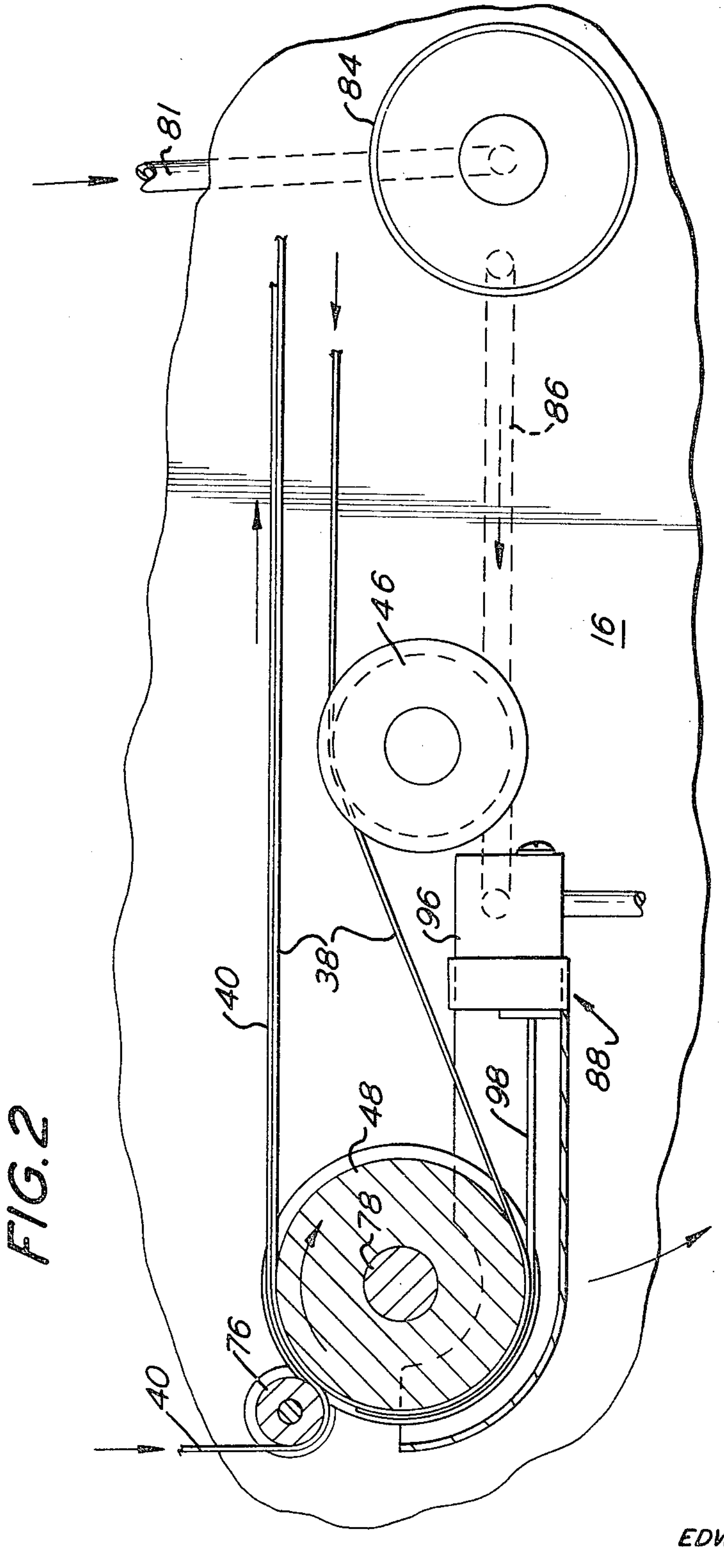
FIG. 2 is a plan view of the fluid feed assembly showing the relationship between the fluid applicator and the film and magnetic tape.

Referring now to the drawings in detail, wherein like numerals indicate like elements, there is shown in FIG. 1 a perspective view of the apparatus 10 for applying magnetic tape to movie film.

As shown, the entire apparatus 10 is either mounted within or on the cabinet 12 which consists of a welded aluminum frame 14 which supports a plurality of side and front panels that define the cabinet. The cabinet 12 as constructed houses and supports two basic sub-assemblies comprising the top assembly 16 and the bottom assembly 18. In general, the top assembly supports two torque motors, a micrometric flow control valve, the entire laminating assembly, the tape feed assembly, the film feed assembly, the tape sensing apparatus, and the fluid sensing apparatus. The bottom assembly 18 consists of a take-up reel assembly, the drive assembly, the film sensing assembly, and the control panel. Each of these items and assemblies is described in detail.

The film onto which the magnetic tape is to be laminated is fed from film reel 20 and taken up on film reel 22 as shown in FIG. 1. Each of the reels 20 and 22 are preferably of laboratory quality. These reels are designed to run true on torque motors which support them. The back face 24 and 26 (that is the face normally mounted adjacent to the panels which support the top assembly 16 and bottom assembly 18) of each reel is made of a rigid material such as aluminum. The hub 28 or 32 of each reel is also made of a metal and is relatively large in diameter; e.g. three inches. Each hub contains a slot with a spring loaded ball (not shown) for gripping the ends of the film. The outward faces 34 and 36 of each reel is preferably made of a transparent material such as for example acrylic resin plastic. In many applications, it may be desirable to run the reels 20 and 22 without the protective face covers 34 and 36. For this reason, each face cover 34 and 36 is made so that it is removable by turning it a short distance counterclockwise and thus snapping it free. A thumb nut is preferably provided to retain each reel 20 and 22 and also so that the face covers 34 and 36 cannot be removed until the thumb nut is removed. Thus, there is no likelihood of accidentally removing the face covers 34 and 36.

The reel 20 is shown in its film supply position. In this position it rotates in the counterclockwise direction as indicated by the arrow. Reel 22 is mounted in the take-up position for the film and magnetic tape. As thus mounted, it rotates in the clockwise direction as indicated by the arrow. Each of the reels 20 and 22 is mounted on a torque motor mounted beneath the supporting panel. Each motor provides a true running bearing as well as the mounting for a precision spindle on which each reel is mounted. A pin (not shown) in the flange of the spindle may engage a slot in each reel to assure positive engagement. Knurled thumb nuts are provided for securing the reels 20 and 22 against their respective spindles.

Film 38 onto which magnetic tape 40 is to be laminated is fed from the reel 20 over a friction clutch assembly 42. The friction clutch assembly 42 is the only sprocket in the entire apparatus 10. The film 38 passes over the friction clutch assembly 42 and its sprocket holes engage the assembly in the sprocket wheel. The friction clutch assembly 42 is mounted on a rigid shaft and has a spaced friction device with a spring loaded spider and adjustable thumb nut to control the exact amount of tension on the film. The purpose of the friction clutch assembly 42 is to isolate any irregularity in the film coming off the supply reel 20; that is, the friction clutch assembly 42 insures a steady supply and tension of film before it reaches the laminating position.

To make the machine convertible from 8 mm. film with a pair of sprocket holes to super 8 film, the clutch assembly 42 is provided with a thumb nut which when undone permits the sprocket to be replaced with the correct type. In addition, a 16 mm. sprocket may be mounted on the friction clutch assembly 42. To eliminate the possibility of putting any one of the sprockets on backwards, a dummy pin may be mounted on the sprocket so that in case it is assembled with the wrong side out, the thumb nut cannot be remounted.

After passing around the friction clutch assembly, the film is passed over two idler pulleys 44 and 46. The idler pulleys 44 and 46 are preferably interchangeably mounted for 8 and 16 mm. widths. Each pulley 44 and 46 is adjusted in size so that there is a 5° lead-in angle at the extremities of the film. Moreover, the surface of the pulleys which engages the film is relieved by a recess so that only the sides of the film rest on an area of the pulley that is 30 mils in width. Thus, the picture area of the film rides clear of the idler pulleys 44 and 46. The same construction is used for all other idler pulleys used throughout the machine except for the idlers 56 and 58 at the drive wheel position.

The film leaving idler pulley 46 passes around the laminating wheel assembly 48 where the magnetic tape 40 is laminated to its surface. The details of the laminating wheel assembly are described below.

After leaving the laminating wheel assembly 48, the film with the magnetic tape now laminated to its surface passes over the outboard idler pulley asemblies 52 and 54. These pulley asemblies are mounted on spindles so that their peripheries project beyond the edge of the apparatus 10 as shown in FIG. 1. Each of the pulleys 52 and 54 is preferably relatively large in diameter because of the condition of the film. Thus, an outside diameter of two inches may be used for the pulley so as to create minimum stressing of the newly laminated film and magnetic tape. It is desirable to minimize stress on the film and magnetic tape because the bonding agent will not have fully set by the time the film and magnetic tape pass over the pulleys 52 and 54.

It should be noted that the top assembly 16 is at an angle with respect to the vertical for reasons which will be more fully explained hereafter. On the other hand, the bottom asembly 18 is mounted substantially parallel to the vertical. Because of these two angles, the film must be warped somewhat prior to passing it over the idler pulleys 52 and 54 which are in the same plane and transitional to the two different planes of the panels. As indicated above, the condition of the film and magnetic tape laminated thereto is such that it is undesirable to apply too much stress to it until the bonding agent has fully set. For this reason, the idler pulley 52 is mounted so that it rotates in a plane whose angle with respect to the vertical is intermediate that of the panel which supports top assembly 16 and the vertical. In a like manner, the idler pulley 54 rotates in a plane whose angle is intermediate the angle of the panel which supports top assembly 16 and the vertical. The result is that there is only a slight warp between the laminating wheel 48 and the idler pulley 52, a slight warp between the idler pulleys 52 and 54 and a slight warp between the idler pulley 54 and the idler 56 over which the film and magnetic tape pass before reaching the drive pulley 30.

It should be noted that the route of the film 38 with the magnetic tape 40 laminated to it from the laminating wheel 48 to the drive pulley 30 is the longest possible distance on the apparatus 10 with a minimum number of pulleys. This route is provided so as to maximize the amount of time for the bonding agent for the film 38 and magnetic tape 40 to set prior to reaching the drive pulley 30.

After leaving the large diameter outboard idler pulley 54, the film passes over idler pulley 56 which has a full smooth surface.

The laminated film and magnetic tape passes from the idler pulley 56 over a sprocketless drive asembly 30. The sprocketless drive assembly 30 has a hub which is accurately machined to fit the shaft of a drive motor that has been appropriately geared to the correct speed. Most of the mass of the drive assembly 30 is located in an acrylic plastic that has been pressed into place on a metal hub. The outer surface of the drive assembly 30 which engages the film is provided with a uniform coating of silicone rubber. The depth of the rubber coating is preferably between 0.020 to 0.040 inch. Thus, the film is driven by engagement with a non-slip surface.

After leaving the drive assembly 30, the film passes over an idler pulley 58 which is the same as idler pulley 56. The surfaces of idler pulleys 56 and 58 are positioned so that the film properly tracks around the drive assembly 30 as it feeds onto and off of it. Moreover, the idler pulleys 56 and 58 maintain the proper sector of the pulley 30 in contact with the film at all times.

After leaving the idler 58, the laminated tape and film are taken up on the reel 22. The reel 22 is driven by a torque motor in the manner to be explained below.

The magnetic tape 40 is fed from the tape reel assembly 64 which preferably is made of a white acrylic plastic back face 66 and a clear front face 68 together with a retainer and spacer which hold the two faces together in accurate concentric alignment. The retainer which holds the panels together is accurately machined. The front face is preferably made of a clear plastic material so that the roll of tape wound thereon may be visually observed at all times.

The tape reel assembly 64 is fixed to a spindle in the same manner as the film reel assembly 34. The spindle is connected to a four pole torque motor with a preset fixed torque.

The magnetic tape 40 which preferably is 0.030 inch in width unwinds from the tape asembly 64 and passes over the tape idler pulleys 70 and 72. Tape idler pulleys 70 and 72 are machnied to have 5° lead-in sides and a constant width at the bottom of the pulley groove. For 8 mm. film, the width at the bottom of the groove for each pulley is 0.030 inch. For 16 mm. film, the width at the bottom of the groove of each tape pulley is .030, .050, or .100 inch depending on the width of the magnetic tape. The pulleys 70 and 72 rotate freely on stainless steel shafts with appropriate bearings. The shaft supporting idler pulley 70 projects further from the panel supporting the top assembly 16 than does the shaft supporting the pulley 72. Thus, the tape 40 passing from the reel 64 is brought closer to the aforesaid panel in stepwise fashion.

After passing over the idler pulley 72, the magnetic tape 40 passes over tape guides 74 and 76 which are small diameter rotating guides. The guides 74 and 76 are mounted by means of a loaded friction nut to the panel which supports top assembly 16. The thread for the nut preferably has a pitch of 32 threads per inch so that a very fine adjustment to the position of the magnetic tape 40 relative to the laminating wheel 48 can be obtained. The tape guides 74 and 76 each have 5° lead-in angles on each side. The bottom of the groove for each of the tape guides 74 and 76 is accurately machined to the appropriate width as described above with respect to the idler pulleys 70 and 72.

The tape guide 76 is spaced very close to the laminating wheel 48. In the preferred embodiment, the spacing is equal to or less than .010 inch from the edge of wheel 48. The tape guide 76 is adjusted closer to or further from the panel which supports the top assembly 16. The effect of such an adjustment is to properly position the magnetic tape 40 with respect to the film riding over the laminating wheel 48.

After passing over the tape guide 76, the magnetic tape 40 rides over a sector of the laminating wheel 48 and mates with the film 38 which has been previously treated to achieve the required bonding. The laminating wheel 48 is manufactured as accurately as possible within current manufacturing techniques. The laminating wheel 48 is basically a pulley which has been manufactured to the closest possible tolerances. The film carrying step 49 of the laminating wheel 48, that is the portion at the bottom of the groove defined by the sides 51 and 53 is always at least 0.001 inch less than the standard gauge width of the film less its minus tolerance. This dimension is maintained so that one edge of the film will always be firmly pressed up against the back face 51 of the laminating wheel 48, and is also the edge onto which the magnetic tape 40 is to be laminated. The film is maintained against the back face of the laminating wheel 48 by a floating washer which is spring loaded on the front face 53.

The laminating wheel 48 is machined to run at 0—0 concentricity for the diameter of the bottom of the groove and the back face. The necessity for a high degree of accuracy in the laminating wheel 48 should be obvious to those skilled in the art. The wheel 48 supports the film 38 while fluid is carefully applied to it at a timed rate. Moreover, the laminating wheel 48 supports the film as the magnetic tape 40 lays itself onto the softened film edge. The laminating wheel 48 rotates freely without a spindle 78 which is mounted on the panel that supports the top assembly 16.

It should be ovious from the foregoing that the present invention depends in part on the manner in which the bonding agent is applied to the film 38 as it passes around the laminating wheel 48. An apparatus for feeding the bonding agent fluid onto the film 38 as it passes over the laminating wheel is now described in detail.

The bonding agent is stored in a reservoir 80 preferably consisting of a bottle made of a plastic material such as polyethylene. The reservoir 80 also includes a flange-like nesting device 82 with an opening in the bottom thereof. Thus, the reservoir 80 which may consist of a bottle may be inverted into the nest 82. The reservoir 80 and nest 82 are preferably located on top of the cabinet 12 so as to maintain a reasonably constant pressure head throughout the fluid support system. Thus, the change in pressure as the fluid is exhausted by reservoir 80 is small in comparison to the overall pressure head created by the height of the reservoir above the metering valve 84. Fluid within the reservoir 80 and the nest 82 is conducted from an opening in the bottom of nest 82 to the metering valve 84 by appropriate conduits which preferably are plastic polyethylene tubing. The reservoir 80 is preferably provided with an opening so that air may rise into it as fluid is conducted to the metering valve 84. If desired, the reservoir 80 may be provided with an insulating jacket so as to prevent heat from volatilizing the fluid within the bottle and causing the vapor pressure to overflow the nest 82. The capacity of reservoir 80 is preferably chosen so that the machine may be operated for an entire day's production.

The metering valve 84 controls the flow of the fluid bonding agent from the reservoir 80 to the apparatus for applying the bonding agent to the film 38. The valve 84 may be described as functioning to maintain micrometric control over the flow of fluid at all times. Although micrometric valves are well known and available on the open market, the preferred embodiment of this invention includes a micrometric valve such as the one described in co-pending patent application Ser. No. 727,494, now U.S. Pat. No. 3,562,783 filed May 8, 1968 and entitled Restrictor. This valve 84 is mounted so that its knob protrudes from the panel supporting the top assembly 16. Adjustment of the knob results in adjustment of the flow rate.

Figure 3:
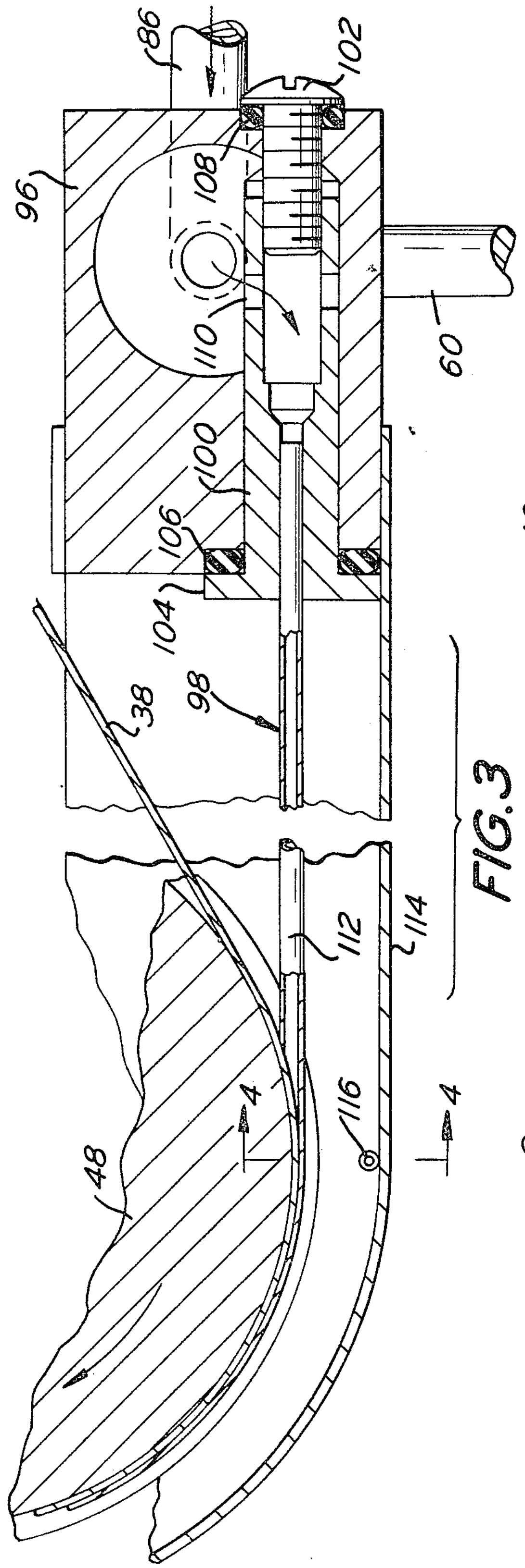
FIG. 3 is an enlarged sectional view of the fluid applicator illustrated in FIG. 2.

Fluid passing through the valve 81 is conducted by appropriate conduit 86, which may take the form of plastic tubing made of polyethylene, to the fluid feed assembly shown generally as 88. The fluid feed assembly 88 is retained on the panel supporting the top assembly 16 by a stainless steel bushing 90 and a bowed retaining ring 92. The fluid passes from conduit 86 through a hollow shaft 94 supported by the bushing 90 to a drilled block 96 which supports the applicator needle 98. The block 96 is drilled so that the fluid makes a 90° turn and is now conducted in a direction parallel to the surface of the panel which supports the top assembly 16. This is indicated by the arrow within the block 96 in FIG. 3.

The applicator needle 98 includes an elongated hollow needle supporting body 100 which is fitted into a hollowed out portion of the block 96. The body 100 is retained within the block 96 by a threaded fastener 102 which engages an internally threaded portion of the body 100 and draws the flange 104 against the block 96. Appropriate seals 106 and 108 are provided between the flange 104 and screw 102, respectively, to prevent fluid leakage. The seals 106 and 108 are preferably O-rings made of butyl rubber or some other material not affected by the MEK.

The threaded fastener 102 not only retains the applicator needle 98 in the block 96 but also permits it to be readily changed simply by backing the fastener 102 out of the applicator needle body 100 and then removing the needle 98 from the block.

Fluid enters the block 96 from the conduit 86 and passes through an opening 110 in the body 100. The fluid then passes from the body 100 into the needle 112 where it is conducted by capillary action to the laminating wheel 48. The needle 112 may be considered as being in the nature of a specially constructed hypodermic needle. Like a hypodermic needle it is a stainless steel capillary tube for most of its length. However, the needle 112 differs from a hypodermic needle in two respects. In the first instance the portion which engages the laminating wheel has been bent to follow the curvature of the laminating wheel. Thus, the distal end of the needle 112 has a radius of curvature which is the same as the radius of curvature of the outside diameter of the laminating wheel 48. In the second instance, the portion of the needle that is in contact with the film as it passes over the laminating wheel has been ground so that the contact is made by an open channel capillary. In the preferred embodiment, the portion of the needle 112 in contact with the film 38 on the laminating wheel 48 is approximately 50% ground away and polished so that it makes intimate contact with the film. The contact surfaces of the needle are carefully polished so that no rough edges can scratch the film.

Figures 4, 5:
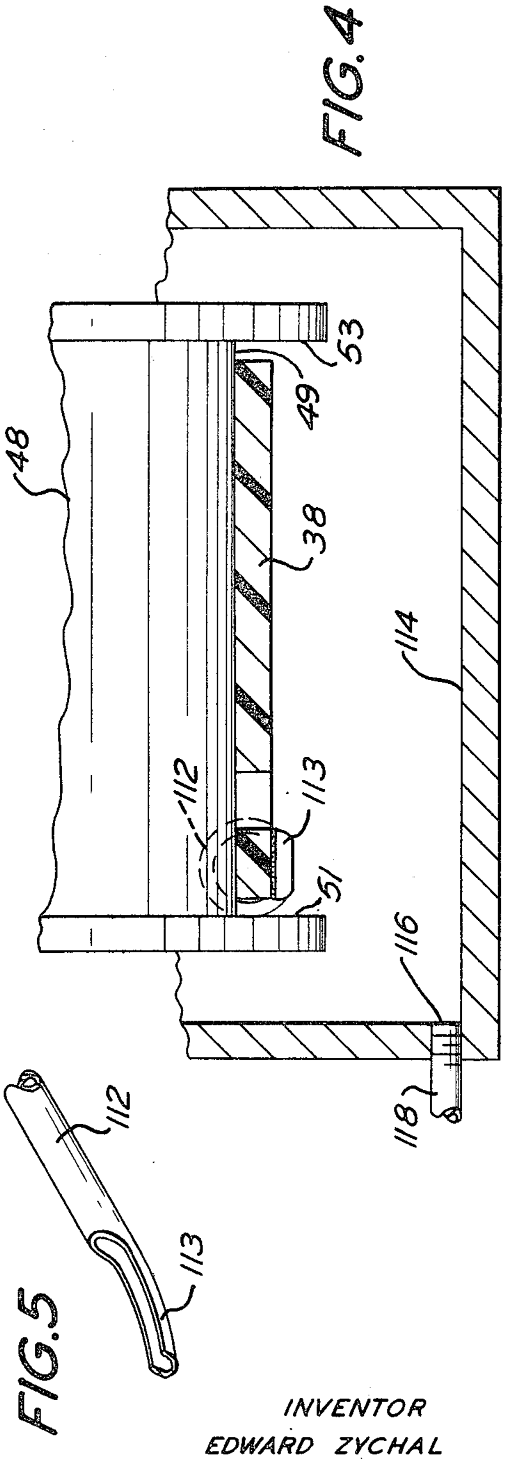
FIG. 4 is a partial sectional view of the fluid applicator illustrated in FIG. 3 taken along the line 4—4.
FIG. 5 is a partial perspective view of the open channel capillary tube used to apply the bonding agent to the film in the present invention.

The fluid is conducted by capillary action through the needle 112 into the open channel portion thereof 113. The open channel portion 113 of the needle 112 has approximately 70° of arc in contact with the film 38 on the laminating wheel 48 as shown in FIG. 4. By properly adjusting the rate of feed of fluid through metering valve 84, a figure which is determined by the rate of rotation of the laminating wheel 48, fluid will be constantly applied over the film 38 in that area where the needle 112 is in engagement with it. An advantage in applying the fluid over an extended portion in the film by using an open channel capillary tube is that it applies the fluid directly to the area where it is needed and avoids the necessity for smearing the fluid as in the case of an applicator which applies the fluid to a small spot area. Moreover, the use of an open channel capillary tube makes it much easier to control the precise area of the film where the fluid is to be applied.

A trough 114 is fixed to the block 96 below the needle 112. Trough 114 generally follows the curvature of the needle 112 and is positioned to catch any excess fluid which may drip from the needle. The trough 114 is provided with an opening 116 at its lowermost point. The opening 116 is connected by flexible tubing 118 to the excess fluid bottle 120. Thus, the bottle 120 accepts and retains any excess fluid which may be caused before set up adjustments can be made.

As indicated above, the entire top assembly 16 is mounted on a panel which is tilted away from the vertical. In the preferred embodiment, the angle between the panel which supports the top assembly 16 and the vertical is 30° or more. The result is that all fluid falling into the trough 114 also flows to the back side thereof and passes through the opening 116. More importantly, the angle of tilt of the entire top assembly 16 prevents the stray fluid from wandering across the film at any point except the edge area. Thus, the fluid is applied to the edge closest to the panel which supports top assembly 16 and will remain on that edge or fall off the film. Thus, there is no possibility that the fluid will affect any other part of the film.

Figure 8:
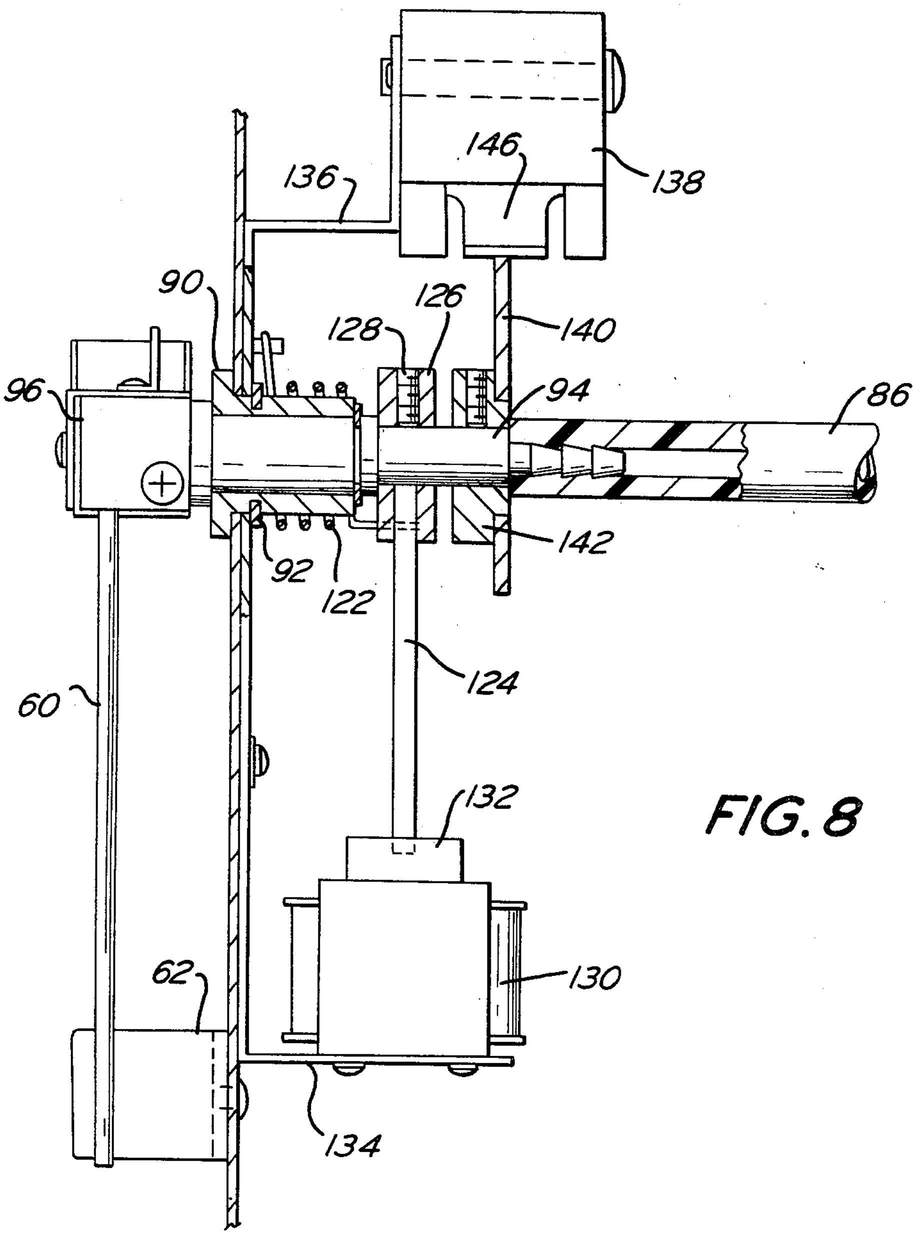
FIG. 8 is a transverse sectional view of the cabinet showing the mounting for the fluid applicator assembly.

Referring now to FIG. 8, it should be noted that the bushing 90 which supports block 96 is rotatably mounted on the panel which supports the entire top assembly 16. Thus, the bushing 90 is free to rotate in an opening in that panel since the bushing flange and retaining ring 92 merely prevent longitudinal shifting of the fluid feed assembly 88. A lever arm 60 is fixed to and depends from the block 96. Rotation of the arm 60 will rotate the block 96 and hence the entire fluid feed assembly 88. A stop 62 is permanently fixed to the panel which supports top assembly 16 and provides a limit stop for the rotation of lever arm 60. Stop 62 is positioned on the panel which supports top assembly 16 so that when it is engaged on the lever arm 60, the needle 112 will be in engagement with the film 38 on the laminating wheel 48. When the lever arm 60 is moved counterclockwise away from the stop 62, the block 96 will be rotated and the needle 112 moved out of engagement with the film 38 on laminating wheel 48. As is explained below, the method of starting the laminating operation of the apparatus 10 includes as a penultimate step the movement of the lever arm 60 into engagement with the stop 62.

The clockwise rotation of lever arm 60 into engagement with stop 62 is against the bias of torsion spring 122 which is positioned around bushing 90. One end of spring 122 is engaged with the panel which supports top assembly 16. The other end is engaged with the bushing 90. Thus, the normal tendency of the spring 122 is to bias the needle 112 out of engagement with the film.

Directly connected to the shaft 94 and extending therefrom is a latching arm 124. Arm 124 is held on the shaft 94 by a collar 126 which is held in position by setscrew 128. The latching arm 124 rotates with the lever arm 60. Latching arm 124 is positioned on shaft 94 so that it engages relay operated latch 130 when the lever arm 60 is brought into abutment with stop 62. Relay operated latch 130 includes a latching mechanism 132 which engages the latching arm 124 and holds the same in position against the bias of spring 122. The purpose of relay operated latch 130 and latching arm 124 is to retain the needle 112 in engagement with the firm 38 on the laminating wheel 48. Thus, movement of the lever arm 60 into abutment with stop 62 causes the latching arm 124 to override the latch 132 on the relay operated latch 130 and thereafter remain in position until the latch 132 is withdrawn. Withdrawal of the latch 132 permits the spring 122 to bias the bushing 90 and hence rotate the entire fluid feed assembly 88 to move needle 112 away from the laminating wheel 48. The relay operated latch 130 is supported by an appropriate bracket 134 fixed to the panel which supports top assembly 16.

The panel which supports top assembly 16 also supports the brackets 136 which mounts the cam operated snap action switch 138 in position for engagement by the cam 140. Cam 140 is supported on shaft 94 by the collar 142. The angular position of cam 140 may be adjusted by rotating collar 142 which is fixed in position on the shaft 94 by the setscrew 144. The relative angular position of cam 140 on shaft 94 relative to the toggle 146 of switch 138 is such that the toggle is mechanically biased in the appropriate manner according to the rotated position of the fluid feed assemby 88 as determined by operation of the lever arm 60.

The foregoing describes in detail the mechanical elements of the apparatus 10 as well as their physical layout. For a detailed description of the electrical components, reference should be had to FIG. 7 where there is shown a schematic electrical circuit diagram. The electrical circuit provides the control function for the apparatus 10.

The power for energizing the circuit is derived from a commercial source of 60 Hz. alternating current at 110–120 volts. The electrical power is connected through the off-on power switch 200 and a fuse 202 to contact 204*b* of double pole double throw switch 204. Contact 204*e* of switch 204 is connected to one side of the single pole single throw switches 206, 208 and 210. Switch 206 is connected through adjustable resistor 212 to film supply torque motor 214. Switch 208 is connected to adjustable resistor 216 to the film take-up torque motor 218. Switch 210 is connected through the adjustable resistor 220 to the tape supply torque motor 222. Each of the motors 214, 218 and 222 is connected to the return side of the power supply as shown.

Each of the variable resistors 212, 216 and 220 is an adjustable pot. By varying the resistance in series with each motor, the force or torque applied by motors 214, 218 and 222 can be adjusted. The effective resistance of resistors 212 and 216 is changed by spring-biased feeler arms 150 and 152. Variable resistors 212 and 216 are calibrated to adjust their resistance in proportion to the rotational position of feeler arms 150 and 152 which rest against the film on the supply and take-up reels 20 and 22. It is desirable that the film and tape be pulled through the apparatus 10 at a constant speed. Constant speed is derived from geared drive motor 30.

Contact 204*e* of double pole double throw switch 204 is also connected to pushbutton switch 224 which is connected in series with drive motor 226. Motor 226 is connected to the return line for the power supply.

If desired, a series connected resistor 228 and neon lamp 230 can be connected across power supply line behind the switch 200 as a power "on" indicator.

The motors 214, 218, 222 and 226 are related to the apparatus as illustrated in FIG. 1 in the following manner:

Motor 214 drives the spindle on which reel 20 is mounted;

Motor 218 drive the spindle on which the reel 22 is mounted;

Motor 222 drives the spindle on which reel 64 is mounted; and

Motor 226 drives the spindle on which drive pulley 30 is mounted.

The foregoing described circuit provides a complete drive system for the apparatus 10. Thus, the circuit is energized by closing switch 200 on the front panel as illustrated in FIG. 1. Closing switch 206 energizes torque motor 214 which applies a constant torque to the film supply reel 20. The torque applied by motor 214 is opposite to the force applied to the film through drive motor 226 and drive pulley 30. Thus, the force applied by torque motor 214 tends to oppose the unwinding action from reel 20. Accordingly, the film 38 is constantly under tension. The amount of torque is adjusted (increased) as the amount of film on the reel 20 is reduced. This is controlled through feeler arm 150 which controls the resistance in variable resistor 212. The increase in torque maintains a constant tension on film 38.

The output of motor 218 is connected to film take-up reel 22 and drives it in a clockwise direction as shown in FIG. 1. The driving force applied by motor 218 to film take-up reel 22 is controlled by adjusting variable resistor 216. The resistance of resistor 216 is mechanically controlled by the pivotable feeler arm 152. As the amount of film on reel 22 increases, the torque applied by motor 218 is increased. Thus, tension on the laminated film and tape is constant as it is wound onto reel 22.

The output of torque motor 222 opposes the direction of unwinding of the magnetic tape from reel 64. Thus, torque motor 222 functions in the same manner as torque motor 214; that is, it maintains a fairly constant tension on the magnetic tape. The output torque of motor 222 is controlled by varying the resistance of variable resistor 220. The resistance of variable resistor 220 is preset and does not change during the laminating process. Motor 226 drives pulley 30 at a constant preset rate.

Figure 7:
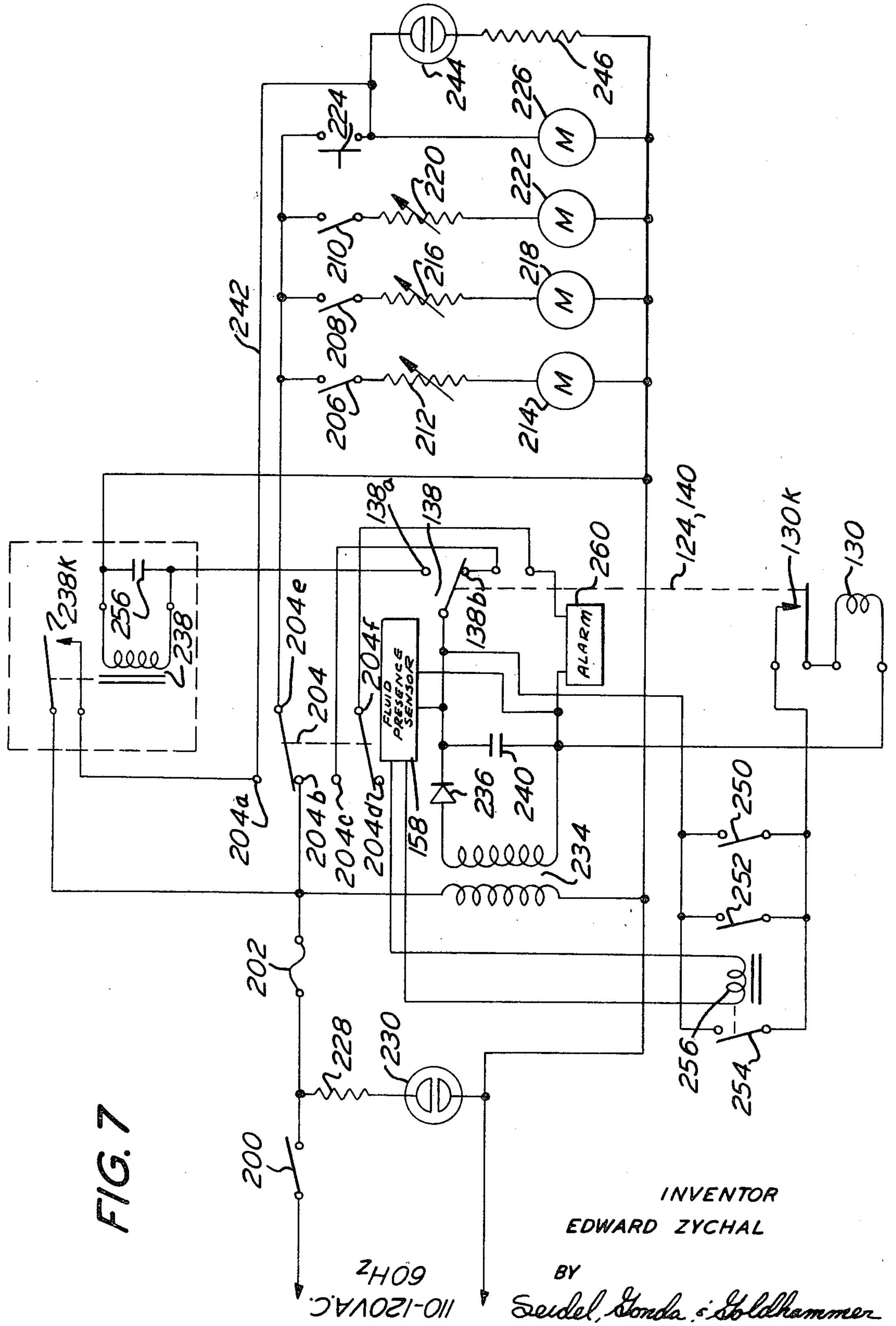
FIG. 7 is a schematic diagram showing the electrical circuitry for the present invention.

The remaining portion of the circuit illustrated in FIG. 7 provides a fail safe control for the circuitry thus far described. It is a function of the remaining portions of the circuit to automatically shut down the drive circuit if any one of three conditions should arise. The entire circuit will shut down if (1) the magnetic tape should break, (2) the film should break, or (3) the fluid supply should fail to apply fluid to the film. Shutdown will occur automatically if any one of these conditions should occur.

The fail safe circuitry is best described in connection with a description of the start up and operation of the apparatus 10. Thus, the film and tape are loaded into the machine and threaded through their respective sprockets and pulleys in the manner previously indicated. Thereafter, the fluid reservoir is filled and the flow control valve opened so that fluid now reaches the fluid application needle 112. Thereafter, switches 206, 208 and 210 are closed, thereby energizing motor 214, 218, and 222, respectively. Motors 214 and 222 apply the correct amount of tension to the film and tape at the off-take side of the reels 20 and 22. Film take-up motor 218 applies tension to the combined film and tape at the take-up side of drive wheel 30.

The machine function of apparatus 10 is begun by depressing pushbutton switch 224 which energizes drive motor 226 and turns reel 30. While holding pushbutton switch 224 in position, the operator pushes lever arm 60 against stop 62, thereby bringing the fluid application needle 112 into contact with the film. Thereafter, the double pole double throw switch 204 is moved from the set up position shown in FIG. 7 to the automatic mode wherein contact blades provide electrical connection between contact 204*a* and 204*e* as well as between contacts 204*c* and 204*f*. Movement of lever arm 60 against stop 62 simultaneously cams single pole double throw snap action switch 138 from its position as shown to connection with contact 138*a*. This completes a circuit which consists of the secondary of transformer 234, diode 236, switch 138, relay 238 and the return line of the power supply. It should be noted that the primary of transformer 234 is connected directly across the power supply line behind fuse 202. If desired, an anti-arcing capacitor 240 may be connected across the secondary of transformer 234 behind diode 236. Switch 138 is operated by cam 140.

The circuit just described energizes relay 238 and closes relay contact 238*k*. Relay 238 remains energized and latches contact 238*k* in its closed position as long as switch 138 engages contact 138*a*. This condition exists as long as cam 140 causes such engagement. The closing of relay contact 238*k* completes a power circuit for drive motor 226 through contact 204*a*, conductor 242 to motor 226. The neon lamp 244 and resistor 246 are connected in parallel with motor 226 as an indicator that the apparatus 10 is operating in its automatic mode. Electrical power for motors 214, 218 and 222 is provided through contact 204a which is connected by switch 204 to contact 204e.

It should be apparent thta power for the entire apparatus 10 is operating in its automatic mode. Electrical and its contact 238k. Thus, the entire apparatus 10 can be shut down simply by de-energizing relay 238. Moreover, relay 238 may be de-energized by removing the electrical connection between switch 138 and its contact 138a; i.e. rotating cam 140.

Cam 140 will in effect keep relay 238 closed as long as lever arm 60 abuts stop 62. This condition is maintained by latch 132 which engages and mechanically latches arm 124. When latch 132 is moved out of engagement with arm 124, spring 122 rotates the fluid feed assembly including cam 140 thereby de-energizing relay 238. Latch 132 is controlled by relay 130 which opens contact 130k when energized. Contact 130k is closed when arm 124 is engaged and held by latch 132. All of the fail safe devices are in circuit with relay 130 and will energize it when necessary.

Fail safe control for the apparatus 10 is provided by relay 130 and its contact 130k. The coil of relay 130 is connected to one side of the secondary of transformer 234 and is in series with the contact 130k. Contact 130k is connected to one side of each of the switches 250, 252 and 254. The opposite sides of each of the switches 250, 252 and 254 are connected to the opposite terminal of the secondary of transformer 234. Thus, a circuit may be completed through relay 130 by closing any one of the switches 250, 252 or 254. Completion of such a circuit would energize relay 130 causing contact 130k to open. This rotates assembly 88 so that switch 138 breaks engagement with contact 138a and moves into engagement with contact 138b. As stated above, this de-energizes the coil in relay 238 and serves to delay the de-energization removing power from each of the motors 214, 218, 222 and 226. Capacitor 256 is connected in parallel with the coil in relay 38 and serves to delay the de-energization thereof for a preset amount of time. In the preferred embodiment, this amount is variable from 5 to 10 seconds. The purpose of such delay is to permit the drive motor 226 and take-up motor 218 to take up the already laminated portions of film and tape onto reel 22 prior to completely shutting down the machine. However, it should be noted that no additional fluid is applied to the film during this period since the mechanical rotation of assembly 88 initiated by the energization of relay 130 has rotated the needle 112 out of engagement with the film.

As stated above, the three conditions upon which it is desirable to shut down the apparatus 10 are film or tape breakage, or the absence of fluid. Switch 250 is a single pole single throw sensitive microswitch which is normally held open by the presence of the film 38. Should the film break and hence cease to be present, the switch 250 closes, thereby energizing relay 130.

Switch 252 is a highly sensitive single pole single throw microswitch which is normally held open by the magnetic tape 40. Should the magnetic tape break for any reason, switch 252 will close and energize relay 230.

Switch 254 is a single pole single throw relay switch controlled by relay coil 256. Switch 254 closes upon the energization of the coil 256. Coil 256 is in turn connected to the fluid presence sensor 258. Fluid presence sensor 258 can consist of a thermistor connected to an integrated circuit assembly that controls a transistor amplifier. The output of the transistor amplifier is applied to coil 256. The thermistor senses the wetness of the film as determined by the temperature drop caused by the volatility of the fluid. Should the fluid not be present, the rise in temperature will be sensed by the thermistor which will energize the amplifier and relay coil 256. Coil 256 will close switch 254 and energize relay 130.

As described above, the closing of any one of the switches 250, 252 or 254 energizes relay 130. Relay 130 opens contact 130k which initiates the removal of needle 112 from the film and the de-energization of relay 238 by opening contact 238a.

The enerization of relay 130 also moves switch 138 into engagement with contact 138b. Since switch 204 is in the automatic mode, contact 204f is connected to contact 204c. This completes a circuit from one terminal of the secondary of transformer 234 through switch 138, contact 138b, contact 204c, contact 204f, alarm 260 and the other terminal of the secondary of transformer 234. Thus, alarm 260 sounds when the apparatus 10 is shut down due to the closure of any one of the switches 250, 252 and 254. The alarm 260 may take the form of a warning light, buzzer, or preferably both.

The cause of the machine shutdown is readily determined by visual inspection and can be repaired. Thereafter, the apparatus 10 may be started up again.

The normal operation of the machine should be apparent from the foregoing. A typical operation consists of moving all switches 200, 204, 206, 208 and 210 to their off or set up positions. The reservoir 80 is filled with fluid and metering valve 84 adjusted so that the fluid begins to flow to the needle 112. Thereafter, the power on switch 200 is moved to its on position.

With the apparatus 10 in the condition described above, the reel 20 with a load of film 38 wound thereon is mounted on hub 28 and threaded through the machine to take-up reel 22. Thereafter, switch 206 is closed so as to energize torque motor 214 and apply tension to the film. Now switch 208 is closed to energize torque motor 218 and apply takeup torque to the film 38.

Next, magnetic tape previously wound on reel 64 is mounted on its hub. The tape 40 is threaded through the machine and attached to the film 38 by any conventional means such as pressure sensitive tape. Thereafter, the switch 210 is closed to energize torque motor 222 which applies the correct amount of tension to the tape 40.

The next step in the operation is to depress pushbutton 224 which energizes drive motor 226. With drive motor 226 energized, all functions of the machine can be checked for smooth operation.

Thereafter, metering valve 84 is adjusted to provide the correct number of drops per minute to needle 112.

The next step in the operation of the machine is to move arm 60 against stop 62 and hold it in that position. Thereafter, switch 204 is moved from the setup mode illustrated in FIG. 7 to the automatic mode. Relay 238 is now latched closed and arm 124 held in position by the latch 132. The apparatus 10 henceforth commences automatic operation.

The apparatus will shutdown in the manner explained above if film 38 should break, tape 40 should break, or fluid flow should cease.

A suitable fluid for laminating the acetate base magnetic tape to the film is MEK having a suitable commercially available acetate cement therein. Five (5%) by volume of the fluid will be the acetate cement. A commercially available cement which has been found suitable is E. I. du Pont's "DUCO" cement. Other commercially available acetatecements may be used.

In the alternative embodiment of the present invention, the magnetic tape 40 is laminated face-down to the film 38. The apparatus used in the alternative embodiment is identical to the apparatus 10. The tape 40 and the fluid are different as will appear hereinafter. In this embodiment, a polyester base magnetic tape may be utilized. The polyester base will not be affected by the fluid utilized to adhere the magnetic oxide coating to the film.

Figures 6, 9:
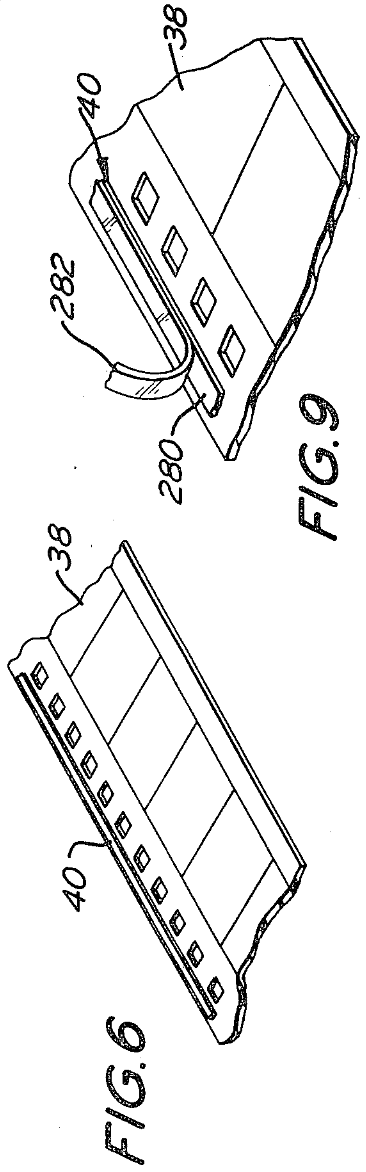
FIG. 6 is a perspective view showing the relative position of the magnetic tape on the film.
FIG. 9 is a perspective view showing the magnetic sound track applied to the film in accordance with the alternative embodiment of the present invention.

The film is wetted in the same manner as in the first embodiment of this invention, but the magnetic tape 40 comes into contact with the film 38 face-down. The fluid in the reservoir 80 permeates the oxide coating 280 of the polyester base tape 40, weakens the bond between the oxide coating 280 and the polyester base 282 (FIG. 9) and has sufficient cementing properties to adhere the oxide coating to the film. The fluid gels the oxide coating which facilitates separation of the oxide coating 280 from the polyester base 282.

A suitable fluid which may be utilized in this embodiment consists of 2 parts acetate cement, 8 parts MEK, 3 parts butyrate solution and 30 parts methyl iso butyl ketone. A suitable butyrate solution is commercially available and is sold as Testors #22 Butyrate Dope which is sold by Testor Corporation, Rockville, Ill., and which contains methyl cellusolve and iso-butyl alcohol.

The stripe adheres to the film within a relatively short period of time on the order of 10 minutes. Thereafter, the polyester base 282 may be peeled away from the film 38 and oxide coating 280, thus leaving the striped film. The polyester base need not be removed immediately from the film and in normal operation, the polyester base remains on the film and oxide coating for a minimum of one-half hour.

The present invention may be embodied in other specific forms without departing from the spirit or essential attributes thereof.

It is claimed:

1. In an apparatus for laminating a magnetic track onto movie film including magnetic tape supply means, movie film supply means, feed means for simultaneously and continuously feeding said magnetic tape and movie film from their respective supply means into a laminating zone, and take-up means for accumulating the laminated movie film having the magnetic track thereon leaving said laminating zone, laminating means at said laminating zone, said laminating means including a surface over which said magnetic tape and movie film pass in contact with each other, and means for applying a bonding agent to laminate said magnetic track to said movie film, said bonding agent application means including an applicator needle having an elongated fluid channel extending in a longitudinal direction with respect to said film for applying the bonding agent over an elongated area in a longitudinal direction before the point of contact between said magnetic tape and movie film, and means to move said channel toward the surface into a bonding agent applying position and away from the surface to an inoperative position.

2. In an apparatus in accordance with claim 1 wherein said magnetic tape feed means feeds said magnetic tape in facedown orientation so that the base of said magnetic tape can later be removed thus leaving the magnetic track laminated to said movie film, said laminating means laminating only one face of said magnetic tape to said movie film.

3. In an apparatus in accordance with claim 1 wherein said magnetic tape feed means feeds said magnetic tape base down so that the base of said magnetic tape is laminated to said film thus leaving the magnetic track exposed.

4. Apparatus for laminating a magnetic track onto movie film including magnetic tape supply means, movie film supply means, feed means for simultaneously and continuously feeding said magnetic tape and movie film from the respective supply means into a laminating zone, take-up means for accumulating a laminated movie film having the magnetic track thereon leaving such laminating zone, laminating means at said laminating zone, said laminating means including a surface over which said magnetic tape and movie film pass in contact with each other, means for applying a bonding agent to laminate said magnetic track to said movie film, said bonding agent application means including an applicator member stationed adjacent said surface for applying the bonding agent over an elongated area in a longitudinal direction before the point of contact between said magnetic tape and movie film, means for moving said applicator member into a first position wherein the bonding agent contacts one of the said magnetic tape and movie film and a second position wherein said applicator member is moved away from and the bonding agent is out of contact with said one of magnetic tape and movie film, means to shut down said apparatus in the event of film breakage, tape breakage, or the absence of bonding agent at the laminating zone, said shut-down means including detecting means for detecting film breakage, tape breakage, or the absence of bonding agent, and means responsive to said detecting means for initiating means for moving said applicator member out of an operative bonding agent applying position.

5. In an apparatus in accordance with claim 4 wherein said applicator needle includes a capillary channel.

6. In an apparatus in accordance with claim 4 wherein at least a portion of said applicator needle has a radius of curvature equal to the radius of curvature of said surface.

7. In an apparatus in accordance with claim 4 wherein said means to shut down said apparatus includes means to terminate the feeding of said magnetic tape and movie film and the taking up of the laminated movie film having the magnetic track thereon.

8. In an apparatus for laminating a magnetic track onto movie film including magnetic tape supply means, movie film supply means, feed means for simultaneously and continuously feeding said magnetic track and movie film from their respective supply means into a laminating zone, take-up means for accumulating the laminated movie film having the magnetic track thereon leaving said laminating zone, laminating means at said laminating zone, said laminating means including a surface over which said magnetic tape and movie film pass in contact with each other, means for applying a bonding agent to laminate said magnetic track to said movie film, said bonding agent application means including an applicator needle having an elongated fluid channel stationed adjacent said surface for applying the bonding agent over an elongated area in a longitudinal direction before the point of contact between said magnetic tape and movie film, means to move said channel into and out of an operative bonding agent applying position, said bonding agent applying means including a reservoir of bonding agent fluid, means to conduct said bonding agent from said reservoir to said channel, said conducting means including a valve to meter the flow of fluid to said channel, and said channel being an open capillary.

9. In an apparatus in accordance with claim 8 wherein said bonding agent applying means includes a pivotally mounted support for said open channel, bias means for normally urging said support to a pivotal position wherein said open channel is biased by said biasing means to the inoperative bonding agent applying position, and latch means for latching said support in a pivotal position wherein said open channel is in the operative bonding agent applying position.

10. In an apparatus in accordance within claim 9 including means to release said latching means so that said channel is moved to the inoperative bonding agent applying position, and means to initiate said release means, said initiation means including means responsive to the detection of film breakage, tape breakage or the absence of bonding agent fluid.

11. In an apparatus in accordance with claim 9 wherein said surface is a rotatably mounted cylinder and said fluid channel is curved along its longitudinal axis, the radius of curvature of said fluid channel being equal to the radius of curvature of said cylindrical surface, whereby said channel may fully engage said surface, and said fluid channel being a capillary.

12. Apparatus for laminating two continuous tapes comprising a laminating zone, feed means for feeding the first tape to said zone, feed means for feeding the second tape to said zone, said laminating zone including a laminating surface, bonding agent applying means including an applicator needle comprising a generally tubular member having an open capillary channel adjacent said surface, means for feeding a bonding agent to said tubular member and said channel, means for passing said first tape between said channel and said surface to thereby deposit the bonding agent on said first tape, means for drawing said first and second tape over said laminating surface to thereby effect a bond therebetween, and takeup means for accumulating the laminated tapes.

13. Apparatus as set forth in claim 12, wherein said surface is a cylindrical rotatable surface, said apparatus further including means for detecting malfunction of said apparatus and moving said capillary channel out of contact with said first tape upon detection of malfunction.

14. A method of laminating a magnetic track to movie film comprising the steps of feeding a magnetic tape having a magnetic track thereon to a laminating zone, feeding movie film to the laminating zone, supplying a bonding agent to an open fluid channel, passing one of the movie film and magnetic tape over the open fluid channel to apply bonding agent thereto along an elongated flow path in a longitudinal direction, laminating the magnetic track to the movie film, sensing malfunction of the laminating apparatus, and automatically separating the open fluid channel from the one of the movie film and magnetic tape upon malfunction of the laminating apparatus.

15. A method as set forth in claim 14 including the steps of sensing the presence of tension on the movie film, sensing the presence of tension on the magnetic tape, and sensing the presence of bonding agent in the fluid channel in order to detect malfunction of the apparatus.

References Cited

UNITED STATES PATENTS

| | | | |
|---|---|---|---|
| 1,184,050 | 5/1916 | Toeplitz | 308—133 |
| 1,396,900 | 11/1921 | Tworski | 222—164 |
| 1,883,562 | 10/1932 | Chipman et al. | 274—41.4 |
| 2,222,666 | 11/1940 | Jacobson et al. | 200—61.18 |
| 2,628,929 | 2/1953 | Persoon et al. | 156—238 |
| 2,756,301 | 7/1970 | Sutton | 200—61.2 |
| 2,869,878 | 1/1959 | Camras | 274—41.4 |

FOREIGN PATENTS

| | | | |
|---|---|---|---|
| 773,281 | 11/1934 | France | 308—133 |

SAMUEL FEINBERG, Primary Examiner

J. V. DORAMUS, Assistant Examiner

U.S. Cl. X.R.

156—301, 547